Nov. 5, 1963  F. SÖLDNER  3,109,273
DUST PROTECTORS FOR HARVESTING MACHINES
Filed Aug. 15, 1960  3 Sheets-Sheet 1

INVENTOR
FRITZ SÖLDNER
BY
his ATTORNEY

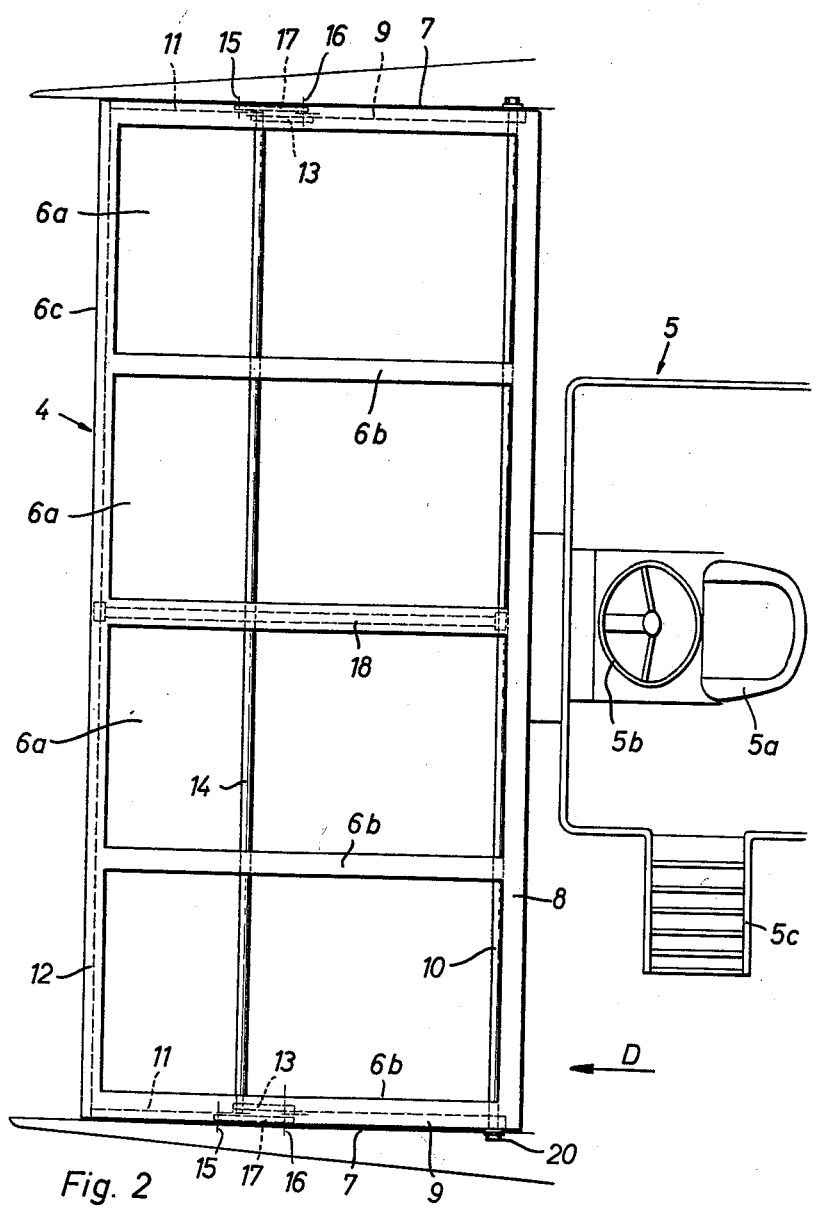

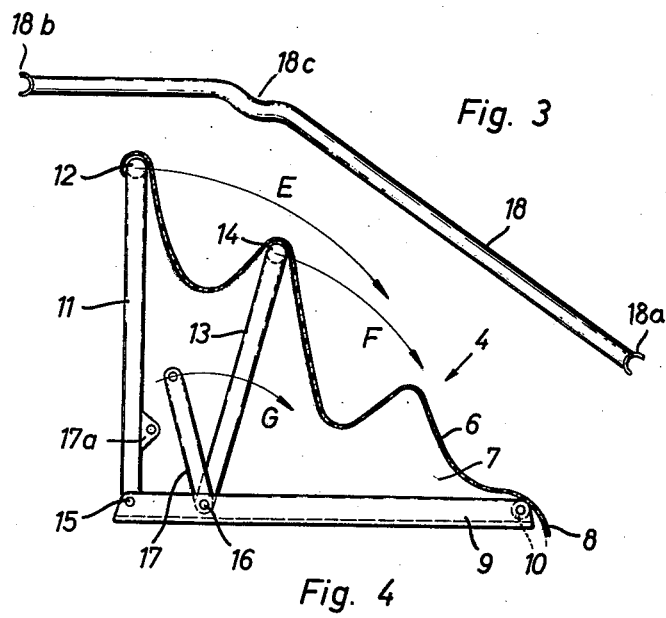

United States Patent Office 3,109,273
Patented Nov. 5, 1963

3,109,273
DUST PROTECTORS FOR HARVESTING
MACHINES
Fritz Söldner, Grosshelfendorf, near Munich, Germany,
assignor to Rupert Fritzmeier, Munich, Germany
Filed Aug. 15, 1960, Ser. No. 49,542
Claims priority, application Germany Aug. 22, 1959
6 Claims. (Cl. 56—190)

The present invention relates to dust protectors for harvesting machines, especially for power driven harvester-thresher combines, and more particularly to protecting covers which shield the operators from the dust generating mechanisms of such machines.

It is well known that certain mechanisms of a harvester-thresher combine will generate large quantities of dust which impedes the vision of and inconveniences the operator. Certain harvesting machines of this general character are equipped with a cabin which encloses the driver's compartment and prevents the dust from inconveniencing the driver. However, since the harvesting of various crops, particularly grain, takes place in the very hot summer months, the occupant of a fully enclosed cabin is uncomfortable and, in fact, the heat in such cabins often becomes unbearable particularly since the cabin is fully exposed to the sun rays. Proposals are known to install an air conditioning unit in the cabins of harvesting machines; however, such units cannot always reduce the temperature to a bearable level and, in addition, an air conditioning unit for a motor driven conveyance is rather expensive and adds considerably to the initial cost of such machines. The operator, i.e. the driver of a harvesting machine, prefers to be exposed to the sun and to the breeze without, however, being compelled to swallow the dust lifted up by the mechanism located in front of the driver's seat.

An important object of the present invention is to provide a protective cover for the dust generating mechanism of harvesting and like machines which will prevent the dust from flowing toward the operator supporting portion of the machine, i.e. toward the driver's seat.

Another object of the invention is to provide a cover of the just outlined characteristics which is constructed and assembled in such a way that the operator is free to observe the operation of the mechanisms under the cover.

A further object of the invention is to provide a very light, inexpensive and durable dust protector for power driven harvesting and like machines which may be readily applied to harvesting machines of presently known design without requiring any or by requiring only slight modifications in the design of such machines.

An additional object of the invention is to provide a dust protector for combines and like harvesting and processing machines which is constructed and assembled in such a way that it may be collapsed into a comparatively small package when not in actual use.

Still another object of the invention is to provide a very simple dust protector for harvesting machines which may be readily applied or removed and collapsed by semi-skilled or unskilled persons.

A concomitant object of the instant invention is to provide a dust protector of the above outlined characteristics which may be provided with means enabling a driver to direct the dust in a given direction.

With the above objects in view, the invention resides in the provision of a dust protector which is of such configuration and which is mounted on a harvesting machine in such a way that the dust generating mechanism or mechanisms of the machine are separated from the operator supporting portion to such an extent that the operator need not be protected by a cabin but is sufficiently shielded from the dust so that he remains free to efficiently handle the machine for any desired periods of time and regardless of the direction in which the wind blows the dust.

In its preferred form, the dust protector assumes the shape of a hood which comprises a preferably collapsible frame and an at least partially transparent skin which is held in the frame and shields the dust producing mechanism when the collapsible frame is secured to the frame of the harvesting machine in front of the operator supporting portion, i.e. in front of the driver's seat. It is preferred to form the dust protector with laterally extending flaps which insure that the dust generated by the machine in actual use will flow laterally along the driver's seat without impeding the vision of and without in any way inconveniencing the operator.

According to a more specific feature of the invention, the dust protector may conceal an air moving or draft producing means, such as a suitable blower or fan which is mounted laterally of but still beneath the hood and blows the dust-containing air in a direction transversely of the direction in which the machine advances so as to keep the dust further away from the driver's seat. By utilizing a reversible fan which is operated by remote control from the driver's seat, the operator may cause the fan to blow in the direction of side wind and to thereby assist the side wind in its dust-removing action.

As stated before, the hood is preferably provided with a collapsible frame so that it may be readily taken apart and stored in the form of a compact package when the harvesting machine is not in actual use.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

FIG. 2 is a fragmentary top plan view of the combine;

FIG. 3 shows a stiffening component of the dust protector frame;

FIG. 4 illustrates the dust protector in partly collapsed position with the stiffening component of FIG. 3 removed; and FIG. 5 is an enlarged fragmentary section taken along the line A—B of FIG. 1, as seen in the direction of arrows, showing the manner of connecting the dust protector frame to the frame of the combine.

Figure 1:
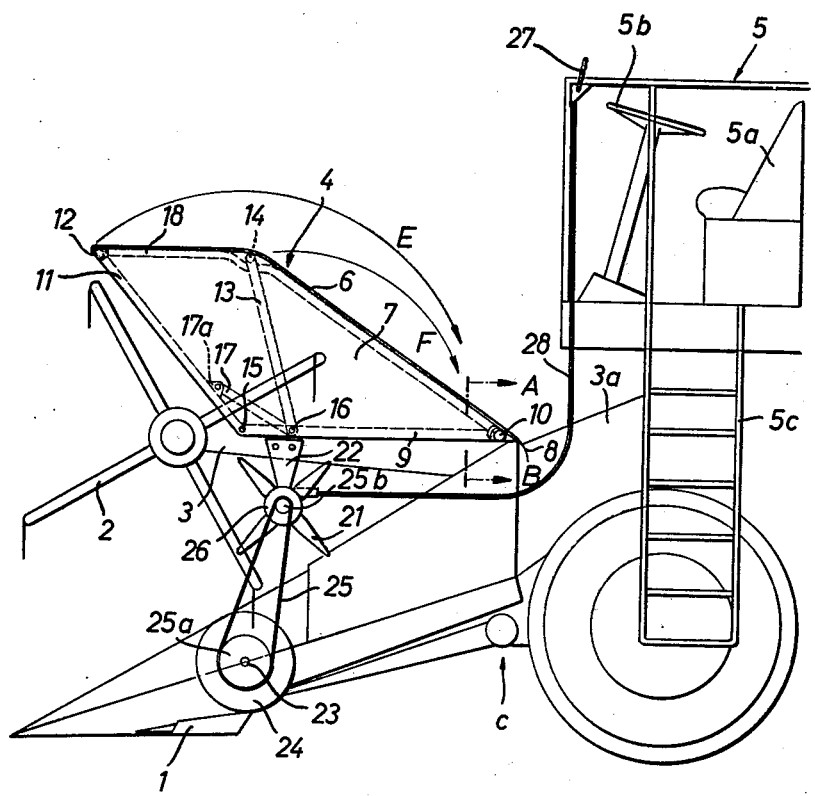
FIG. 1 is a schematic side elevational view of a power driven harvester-thresher combine which is provided with a dust protector embodying my invention.

Referring now in greater detail to the illustrated embodiment, and first to FIG. 1, there is shown a harvesting machine in the form of a power driven harvester-thresher combine C which comprises a cutting mechanism 1 located beneath a customary gathering reel 2. The latter is mounted in two spaced lateral brackets 3 which form part of the machine frame 3a. The parts 1 and 2 constitute the dust generating mechanism of the combine C, and this dust generating mechanism is covered by a novel dust protector 4 which shields the rearwardly located operator supporting portion 5 of the machine. The operator supporting portion 5 includes a platform with a driver's seat 5a located in the rear of the steering wheel 5b. The seat 5a is accessible by a ladder 5c.

The dust protector 4 assumes the form of a hood which comprises a collapsible frame to be described in greater detail hereinafter, and a flexible layer or skin 6. The latter comprises two lateral substantially vertically extending portions or flaps 7, and a transverse rear flap 8 which extends downwardly and beyond the frame of the hood 4. The transverse flap 8 keeps any dust reaching the rear portion of the hood 4 from ascending toward the driver's seat 5a. This rear flap 8, as well as the lateral or side flaps 7 may consist of canvas or a like textile material. The major portion of the skin 6 is shown in FIG. 2. This major portion is turned toward the operator occupying the seat 5a and preferably consists at least in part of a transparent material, e.g. a comparatively soft synthetic plastic such is polyvinyl chloride. As clearly shown in FIG. 2, the skin 6 comprises four transparent windows 6a which extend in the direction in which the machine C advances (arrow D), five parallel longitudinal reinforcing and partitioning strips 6b, and a transverse reinforcing front strip 6c. The rear ends of the windows 6a are reinforced by the transverse flap 8, and the reinforcing strips 6b, 6c may consist of the same material as the flaps 7, 8, e.g. canvas. The transparent windows 6a enable an operator to oversee the operation of the mechanism covered by the dust protector 4.

The frame of the dust protector 4 is shown in FIGS. 1 to 4. It comprises two spaced, preferably parallel, coplanar, substantially horizontal lateral frame members in the form of L-shaped rails 9 whose rear ends are held in spaced position by a transverse frame member in the form of a tubular connector 10. The rails 9 extend in a direction parallel with the direction of the arrow D. The frame further comprises two inverted U-shaped frame members whose lower ends are articulately connected with the rails 9. As best shown in FIG. 4, the front inverted U-shaped frame member comprises two braces 11 whose lower ends are articulately connected to the forward ends of the respective rails 9 by pivot pins 15, and a transversely extending horizontal connecting member or tube 12 which is secured to the upper ends of the pivotable braces 11. The rear inverted U-shaped frame member comprises two spaced braces 13 which are disposed in two vertical planes and whose lower ends are articulately connected to the respective rails 9 by pivot pins 16, and a transversely extending horizontal connecting member or tube 14. It will be noted that the pivot pins 16 are located slightly in the rear of the pins 15, and that the connecting member 14 has its ends secured to the upper ends of the pivotable braces 13. The means for securing the front inverted U-shaped frame member 11, 12 in operative position comprises two short spreaders or stiffening braces 17 whose lower ends are pivotally mounted on the pins 16 and whose upper ends may be releasably secured to lugs 17a provided on the adjacent braces 11. Of course, the dust protector 4 may comprise only one stiffening brace 17. The means for retaining the rear U-shaped member 13, 14 in operative position comprises a stiffening bar 18 which is best shown in FIG. 3. This bar comprises a rear end in the form of a semicylindrical shell 18a which forms a yoke and may engage with a median portion of the transverse frame member 10, and a similar yoke 18b is provided at the front end of the stiffening bar 18 to engage with a median portion of the horizontal connecting member 12 when the U-shaped frame member 11, 12 is already arrested in the position of FIG. 1 by the stiffening brace or braces 17. An intermediate portion of the stiffening bar 18 is formed with a downwardly extending hump which defines an upwardly opening comparatively shallow recess 18c adapted to receive the connecting member 14 of the rear inverted U-shaped frame member 13, 14 to hold the latter in operative position. It will be noted that the bar 18 by itself stiffens the entire dust protector 4.

FIG. 4 illustrates the dust protector in partly collapsed position. The stiffening bar 18 is already removed and the non-represented connecting pins which secure the stiffening braces 17 to the lubs 17a are withdrawn so that the braces 11, 13 and 17 may be pivoted in clockwise direction as indicated by the arrows E, F and G, respectively. In their fully collapsed position, the U-shaped frame members 11, 12 and 13, 14 are parallel with the common plane of the lateral frame members 9. One of the flaps 7 is assumed to be removed in FIG. 4, and it can be seen in this illustration that the skin 6 may be folded between the collapsed transverse members 10, 12, 14 so that the completely collapsed dust protector 4 forms a comparatively small package which may be conveniently stored in a small area when the machine C is not in actual use. The skin 6 is fixed to the connecting member 12, extends over the connecting member 14, and is secured to the transverse frame member 10.

Referring now to FIG. 5, there is shown one form of a means for securing the dust protector to the frame of the harvesting machine C. Each longitudinal end of the rear transverse tubular frame member 10 receives a nut 19 which is welded thereto. Each nut 19 may receive the stem of a threaded bolt 20 which extends through a horizontal bore 3b provided in an upwardly extending projection 3c of the respective lateral bracket 3, and through a bore 9a provided in the respective rail 9. As shown, each rail 9 rests on the upper surface of the respective bracket 3. A second connection may but need not be provided between the forward end of each rail 9 and the respective bracket 3.

Referring back to FIG. 1, there is shown a draft producing or air moving means in the form of a fan or blower 21 which is mounted beneath the dust protector 4 and is preferably located adjacent to the one or the other lateral flap 7. As shown in FIG. 1, the fan 21 is mounted at the lower end of a plate like bracket 22 which latter, in turn, is secured to the left-hand bracket 3 of the machine frame 3a. The fan 21 is driven by the shaft 23 of the customary feed conveyor 24, for example, by a driving pulley 25a mounted on the shaft 23, by a driven pulley 25b mounted on the shaft of the fan 21, and by an endless belt 25. In its preferred form, the fan 21 comprises a reversible transmission 26 which is operated by remote control from the operator supporting portion 5 of the machine. This remote control mechanism may comprise a Bowden wire 28 and an actuating or reversing lever 27. Of course, it will be readily understood that the reversible transmission 26 may be replaced by an electric motor whose polarity is reversible in any well known manner. The fan 21 produces a wind in a direction transverse to the direction of the arrow D and, depending on the position of the transmission 26, may direct the wind to the right or to the left. For example, if the side wind blows to the left, the fan 21 will be operated to produce a draft in the same direction so as to enhance the dust removing action of the wind.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore such adaptations should and are intended to be comprehended within the meaning and range of equivalence of the following claims.

What is claimed as new and desired to be secured by Letters Patent is:

1. A collapsible hood for dust generating mechanisms of harvesting machines and the like, said hood comprising, in combination, a frame including a pair of spaced lateral frame members, a transverse connecting member extending between and fixed to said lateral frame members, a pair of inverted U-shaped frame members each having a first end pivotally secured to one of said lateral frame members and a second end pivotally secured to the other lateral frame member, first stiffening means connected with said lateral frame members for holding one of said U-shaped frame members in an operative position, and second stiffening means connected with said transverse connecting member and with said one U-shaped frame member and engaging with the other U-shaped frame member for holding said last mentioned U-shaped frame member in an operative position; and a flexible skin connected with said one U-shaped frame member, extending over said other U-shaped frame member, and secured to said transverse connecting member.

2. A collapsible hood for dust generating mechanisms of harvesting machines and the like, said hood comprising, in combination, a frame including a pair of spaced substantially parallel lateral frame members each having a forward end and a rear end, a transverse connecting member extending between and secured to the rear ends of said lateral frame members, a pair of inverted U-shaped frame members each comprising two braces and a transverse connecting member, the braces of one of said U-shaped frame members having lower ends each articulately connected to the forward end of one of said lateral frame members, the braces of the other U-shaped frame member having lower ends each articulately connected to one of said lateral frame members intermediate said forward and rear ends thereof, each of said U-shaped frame members pivotable between an operative position and a collapsed position of substantial parallelism with the common plane of said lateral frame members, first stiffening means comprising at least one member articulately connected to one of said lateral frame members and adapted to be releasably fixed to the respective brace of said one U-shaped frame member, and second stiffening means comprising a bar having a rear end adapted to be secured to said transverse frame member, a forward end adapted to be secured to the connecting member of said one U-shaped frame member, and formed with a recess for receiving the connecting member of said other U-shaped frame member; and a flexible skin connected to the connecting member of said one U-shaped frame member, extending over the connecting member of said other U-shaped frame member, and secured to said transverse frame member.

3. A collapsible hood for dust generating mechanism of harvesting machines and the like, said hood comprising, in combination, a frame comprising two spaced lateral frame members each having a first and a second end, a transverse frame member extending between and connected with one end of each lateral frame member, a first inverted U-shaped frame member articulately connected to the other ends of said lateral frame members and pivotable between an operative position and a collapsed position of substantial parallelism with the common plane of said lateral frame members, a second inverted U-shaped frame member articulately connected to said lateral frame members between said first U-shaped frame member and said transverse frame member and pivotable between an operative position and a collapsed position of substantially parallelism with the common plane of said lateral frame members; and a flexible skin connected to said first U-shaped frame member, extending over said second U-shaped frame member, and secured to said transverse frame member.

4. A collapsible hood for dust generating mechanisms of harvesting machines and the like, said hood comprising, in combination, a frame comprising two spaced lateral frame members each having a first and a second end, a transverse frame member extending between and connected with one end of each lateral frame member, a first inverted U-shaped frame member articulately connected to the other ends of said lateral frame members and pivotable between an operative position and a collapsed position of substantial parallelism with the common plane of said lateral frame members, a second inverted U-shaped frame member articulately connected to said lateral frame members between said first U-shaped frame member and said transverse frame member and pivotable between an operative position and a collapsed position of substantial parallelism with the common plane of said lateral frame members; and an at least partially transparent flexible skin connected to said first U-shaped frame member, extending over said second U-shaped frame member, and secured to said transverse frame member.

5. A collapsible hood for dust generating mechanisms of harvesting machines and the like, said hood comprising, in combination, a frame comprising two spaced lateral frame members each having a first and a second end, a transverse frame member extending between and connected with one end of each lateral frame member, a first inverted U-shaped frame member articulately connected to the other ends of said lateral frame members and pivotable between an operative position and a collapsed position of substantial parallelism with the common plane of said lateral frame members, a second inverted U-shaped frame member articulately connected to said lateral frame members between said first U-shaped frame member and said transverse frame member and pivotable between an operative position and a collapsed position of substantial parallelism with the common plane of said lateral frame members; and a flexible skin connected to said first U-shaped frame member, extending over said second U-shaped frame member, and secured to said transverse frame member, said skin comprising a transversely extending flap projecting beyond said transverse frame member.

6. A collapsible hood for dust generating mechanisms of harvesting machines and the like, said hood comprising, in combination, a frame comprising two spaced lateral frame members each having a first and a second end, a transverse frame member extending between and connected with one end of each lateral frame member, a first inverted U-shaped frame member articulately connected to the other ends of said lateral frame members and pivotable between an operative position and a collapsed position of substantial parallelism with the common plane of said lateral frame members, a second inverted U-shaped frame member articulately connected to said lateral frame members between said first U-shaped frame member and said transverse frame member and pivotable between an operative position and a collapsed position of substantial parallelism with the common plane of said lateral frame members; and a flexible skin connected to said first U-shaped frame member, extending over said second U-shaped frame member, and secured to said transverse frame member, said skin comprising two lateral flaps each extending toward one of said lateral frame members.

References Cited in the file of this patent

UNITED STATES PATENTS

| | | |
|---|---|---|
| 232,748 | Nisonger | Sept. 28, 1880 |
| 1,536,293 | Harris | May 5, 1925 |
| 1,932,714 | Thoen | Oct. 31, 1933 |
| 2,162,347 | Haberstump | June 13, 1939 |
| 2,270,208 | Lindgren et al. | Jan. 23, 1942 |
| 2,495,417 | McConnel et al. | Jan. 24, 1950 |
| 2,598,382 | Holden | May 27, 1952 |
| 2,623,344 | Stafford | Dec. 30, 1952 |
| 2,834,633 | Ashton | May 13, 1958 |